United States Patent [19]

Takayama et al.

[11] Patent Number: 4,880,694
[45] Date of Patent: Nov. 14, 1989

[54] MAGNETO-OPTICAL RECORDING MATERIAL

[75] Inventors: Shinji Takayama, Mitaka; Toshio Niihara, Hachioji; Katsuhiro Kaneko, Sayama; Yutaka Sugita, Tokorozawa, all of Japan

[73] Assignee: Hitachi, Ltd., Tokyo, Japan

[21] Appl. No.: 145,409

[22] Filed: Jan. 19, 1988

Related U.S. Application Data

[63] Continuation of Ser. No. 753,857, Jul. 11, 1985, abandoned.

[30] Foreign Application Priority Data

Jul. 11, 1984 [JP] Japan ................................ 59-142319

[51] Int. Cl.$^4$ ............................................. G11B 7/24
[52] U.S. Cl. .................................... 428/336; 427/132; 428/694; 428/900; 428/928
[58] Field of Search ............... 365/122; 360/131–135; 369/13, 288; 428/694, 900, 928, 336; 427/132

[56] References Cited

U.S. PATENT DOCUMENTS

| | | | |
|---|---|---|---|
| 4,497,870 | 2/1985 | Kudo et al. ..................... | 428/457 |
| 4,670,353 | 6/1987 | Sakurai ............................ | 428/606 |
| 4,734,334 | 3/1988 | Matsushima et al. ............ | 428/900 |

FOREIGN PATENT DOCUMENTS

| | | |
|---|---|---|
| 0084358 | 5/1984 | Japan . |
| 103314 | 6/1984 | Japan . |
| 68854 | 7/1984 | Japan . |
| 2147751 | 5/1985 | United Kingdom . |

OTHER PUBLICATIONS

Aratoni et al., J. Appl. Phys., 57(1), p. 3903, Apr. 15, 1985.

*Primary Examiner*—George F. Lesmes
*Assistant Examiner*—James B. Monroe
*Attorney, Agent, or Firm*—Antonelli, Terry & Wands

[57] ABSTRACT

Disclosed is a magneto-optical recording material whose composition formula is indicated by $(Co_{1-a}M_a)_{100-y}R_y$ where M denotes at least one element selected from the group consisting of elements of the platinum group and Fe, Ni, Nb, Cu, Ag, Al, B, Si and Ge; R denotes either at least two elements selected from the group consisting of Tb, Sm, Gd, Dy, Ho and Y or a single element selected from the group consisting of Tb, Gd, Dy and Ho; the value a satisfies $0 < a \leq 0.5$, while the value y satisfies $14 \leq y \leq 36$ in terms of atomic percent; the material being substantially amorphous. A perpendicularly magnetized amorphous film made of this material is excellent in thermal stability, corrosion resistance etc., and affords a greater read output-to-noise ratio (C/N).

20 Claims, 2 Drawing Sheets

MAGNETO-OPTICAL RECORDING MATERIAL

This is a continuation of application Ser. No. 753,857, filed July 11, 1985, now abandoned.

BACKGROUND OF THE INVENTION

The present invention relates to a magneto-optical recording material in or from which information is written, read and erased with a laser beam, and more particularly to a magneto-optical recording material which has a high corrosion resistance and a great magneto-optic effect well suited to enhance a readout signal to noise ratio (S/N or C/N).

Recently, the magneto-optical recording which affords a high recording density as well as a large memory capacity and which is capable of, e. g., random access to and erasure of information has come into the limelight. In the magneto-optical recording, a magnetic thin film having an easy axis of magnetization in a direction perpendicular to the plane of the film (a perpendicularly magnetized film) is used, and reverse magnetized domains are formed at any desired positions with a light beam, whereby binary data of "1" and "0" are written in correspondence with the senses of the magnetizations. On the other hand, the binary signals subjected to such reverse magnetized writing are usually read out by exploiting the polar Kerr effect or the Faraday effect.

As the magneto-optical media, there have heretofore been proposed perpendicularly magnetized films such as an MnBi crystalline film, a rare-earth - transition metal amorphous film and a garnet single-crystal thin film. Among them, the rare-earth - transition metal amorphous thin film is deemed the most promising at present for the reasons that medium noise is low due to the absence of a grain boundary and that a large homogeneous area is easily prepared. As the rare-earth - transition metal amorphous thin films, Fe-based alloy systems including Fe-Tb, Fe-Gd, Fe-Tb-Gd and Fe-Tb-Gd-Dy or ones in each of which Fe in an amount smaller than 50 at.% is replaced with Co (that is, the Fe content is larger than the Co content), such as Fe-Co-Gd Fe-Co-Dy, Fe-Co-Tb, Fe-Co-Tb-Gd and Fe-Co-Dy-Tb, and Co-based alloy systems including Co-Gd, Co-Tb, Co-Gd-Tb and Co-Tb-Dy are presently under research as disclosed in, for example, the Official Gazettes of Japanese Patent Application Laying-open No. 52-31703, Japanese Patent Application Publication No. 57-34588, Japanese Patent Application Laying-open No. 56-126907, Japanese Patent Application Laying-open No. 57-94948 and Japanese Patent Application Laying-open No. 58-73746. In addition, the Kerr rotation angle in the residual magnetization of the film itself has been enhanced to approximately 0.35° (at a wavelength of 633 nm).

However, Kerr rotation angles or Faraday rotation angles attained with these prior-art alloy systems are insufficient for producing a readout signal level for practical use, and enhancement in the magneto-optic effect of the film itself for raising the S/N ratio still more is needed. As regards overall characteristics required of the magneto-optical recording media, the Fe-based recording films have such disadvantages that when the Kerr rotation angle $\theta_k$ enlarges, the Curie temperature $T_c$ rises in the extreme, so the recording sensitivity lowers, that the lifetime is short due to an inferior corrosion resistance, and that the crystallization temperature is somewhat low, so stable characteristics are not ensured. On the other hand, the Co-based recording films have information recorded by utilizing the property of the presence of a compensation temperature $T_{comp}$ and therefore exhibit a high recording sensitivity, but they have the disadvantages that the thermal stability is inferior and that the Kerr rotation angle $\theta_k$ is insufficient.

SUMMARY OF THE INVENTION

An object of the present invention is to provide a magneto-optical recording material for use in an amorphous magneto-optical recording medium, which is well suited for practical use due to a sufficiently great magneto-optic effect, a high readout S/N ratio (or C/N ratio) attained, and a favorable corrosion resistance as well as a high crystallization temperature.

In order to accomplish the object, the magneto-optical recording material of the present invention is rendered a material whose composition formula is indicated by $(Co_{1-a}M_a)_{100-y}R_y$ where M denotes at least one element selected from the group consisting of elements of the platinum group such as Ru, Rh, Pd and Pt, and Fe, Ni, Nb, Cu, Ag, Al, B Si and Ge; R denotes either at least two elements selected from the group consisting of Tb, Sm, Gd, Dy, Ho and Y or a single element selected from the group consisting of Tb, Gd, Dy and Hc; the value a satisfies $0 < a \leq 0.5$, while the value y satisfies $14 \leq y \leq 36$ (that is, the R content is at least 14 at.% and at most 36 at.%); the material being substantially amorphous.

The inventors have led to the present invention in such a way that in a perpendicularly magnetized amorphous film of a Co-Tb binary system having a high corrosion resistance, the moment of the magnetic element contributive to a Kerr rotation angle is enlarged by replacing part of Co with Fe; that a corrosion resistance, a crystallization temperature, etc. are enhanced by adding an element of the platinum group such as Ru, Rh, Pd or Pt, or Nb, Ni, Cu, Ag, Al , B, Si or Ge and that the Kerr rotation angle is further improved and simultaneously the Curie temperature is optimized by replacing the constituting element Tb with a different rare-earth element, so that the performance of a magneto-optical recording film is enhanced.

As regards the perpendicularly magnetized film mentioned above, it has also been revealed that even in a case where part of Co is replaced with at least one element selected from the group consisting of the elements of the platinum group, Nb, Ni, Cu, Ag, Al, B, Si and Ge and where Fe is not contained, effects similar to those in the aforementioned case where Fe is contained are achieved.

In case of employing the material of the present invention for a magneto-optical recording medium it may be deposited on a substrate as a thin film 200–1500Å thick likewise to the magneto-optical recording materials in the prior arts. Also the substrate may be made of a material hitherto used, for example, glass, polymethylmethacrylate (PMMA) or polycarbonate.

In order to readily produce a perpendicularly magnetized film made of the magneto-optical recording material of the present invention by the use of conventional sputtering or evaporation, the value y of the aforementioned composition formula needs to be at least 14 and at most 36 (that is, the R content needs to be at least 14 at.% and at most 36 at.%). Further, in order to enhance a recording sensitivity, the value y should more preferably be at least 22 and at most 29.

Attaining a magneto-optic effect greater than that of the prior-art Co-Tb film, can be achieved by substituting Fe for part of Co. However, when the amount of substitution a exceeds 0.5, the Curie temperature and the compensation temperature become too high and unsuitable for practical use. Further, by replacing Co with one or more elements among the platinum group elements, Ni, Nb, Al, B, Si, Ge etc., the corrosion resistance as well as the crystallization temperature can be enhanced, and the Curie temperature as well as the compensation temperature can be optimized for practical use. However, when a is greater than 0.5, the degradation of the magneto-optic effect increases. It is therefore desirable to set a at 0.5 or less, more preferably at 0.1 or less. Besides, by replacing Tb with other rare-earth element such as Sm, Gd, Dy, Ho or Y, the magneto-optic effect can be improved still more, or the Curie temperature and the compensation temperature can be optimized without degrading the magneto-optic effect, to improve the recording sensitivity and the read output A rare-earth element in a rare-earth - transition metal amorphous film contributes to making the alloy film an amorphous structure and a perpendicularly magnetized film. In this regard, Tb is also contributive to the stabilization of perpendicular magnetization by increasing a coercive force Hc and simultaneously increasing magnetic anisotropy energy Ku. Accordingly, it is more preferable that Tb is contained in the constituent R of the aforementioned composition formula. It is still more preferable that the proportion of the rare-earth element or elements other than Tb in the constituent R, namely, an atomic ratio occupied by the rare-earth element or elements other than Tb in the total amount of the rare earth elements is at most 0.6. This is elucidated in terms of a composition formula as follows. In the composition formula $(Co_{1-a}M_a)_{100-y}(Tb_{1-c}X_c)_y$ where X denotes at least one element selected from the group consisting of Sm, Gd, Dy, Ho and Y, the value c should still more preferably be set at 0.6 or less. The values a and y are the same as stated before.

While, in the above, the case of the alloys containing Tb has been chiefly described, favorable results were obtained even with compositions each of which contained at least two elements selected from the group consisting of Sm, Gd, Dy, Ho and Y, as rare-earth elements without containing Tb (the others were the same as in the foregoing description).

The case containing Tb and the case not containing Tb are collectively indicated by the composition formula $(Co_{1-a}M_a)_{100-y}R_y$. Here, R denotes at least two elements selected from the group consisting of Tb, Sm, Gd, Dy, Ho and Y, and M, a and y are the same as in the foregoing.

Besides, favorable results were obtained in cases where, in the above composition formula, R was at least one element selected from the group consisting of Tb, Gd, Dy and Ho, and M, a and y were the same as in the foregoing.

It is also effective that thin films having the alloy compositions stated above are further doped with some impurity elements to the end of more improving the recording sensitivity, the corrosion resistance and the lifetime.

The expression "substantially amorphous material" is intended to mean a material with which a diffraction line corresponding to a crystal plane does not appear definitely in an ordinary X-ray diffraction test.

DESCRIPTION OF THE PREFERRED EMBODIMENTS

Now, the present invention will be described in conjunction with examples.

In the ensuing examples, an amorphous alloy film was formed on a substrate in such a way that sputtering was carried out by a magnetron sputtering method or by a bias sputtering method in which a minus bias voltage of $-20$ V to $-150$ V was applied to the substrate, using a composite target wherein one or more rare-earth elements and additional elements each being in the shape of a square plate each side of which was 5 mm long were arranged on a Co disc 110 mm in diameter so as to establish a predetermined composition in terms of an areal ratio, or that a mother alloy of predetermined composition was prepared by vacuum arc melting, whereupon electron beam evaporation was carried out using the mother alloy. Except for Example 5, the substrate was made of glass in the shape of a disc having a thickness of 0.3 mm and a diameter of 10 mm.

EXAMPLE 1

Figure 1:
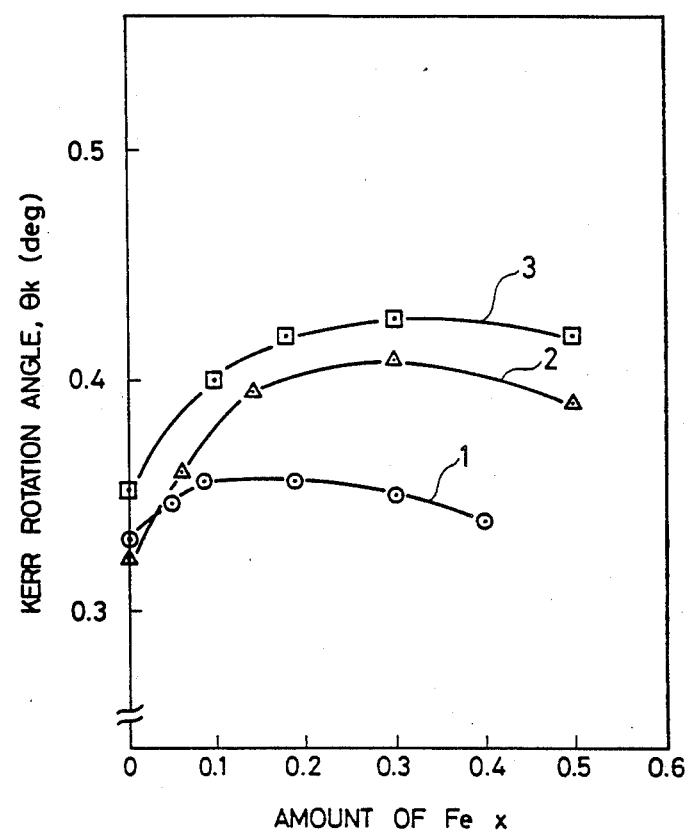
FIG. 1 is a graph showing the relationships between the Kerr rotation angles and the Fe contents of magneto-optical recording materials in an example of the present invention, in comparison with that of a prior-art material.

Samples of this example were prepared by the magnetron sputtering method under the conditions of an Ar atmosphere pressure of $5 \times 10^{-3}$ Torr and a radio frequency power input of 1 kW. The thicknesses of the prepared amorphous films were constant at approximately 1000 Å. FIG. 1 illustrates the composition dependences of the Kerr rotation angles $\theta_k$ of the amorphous films of $(Co_{1-x}Fe_x)_{77}Tb_{23}$ (curve 1), $(Co_{1-x}Fe_x)_{72}(Tb_{0.6}Dy_{0.4})_{28}$ (curve 2) and $Co_{1-x}Fe_x)_{75}(Tb_{0.5}Gd_{0.5})_{25}$ (curve 3) as measured with the light having a wavelength λ of a He-Ne laser (λ = 633 nm). It is seen from FIG. 1 that $\theta_k$ is enlarged by replacing the constituting element Co with Fe and by employing the two constituting rare-earth elements Tb-Gd or Tb-Dy unlike the single element Tb.

EXAMPLE 2

Amorphous films used as samples of this example were prepared by the electron beam evaporation under the condition of a vacuum degree of $1 \times 10^{-6}$ Torr.

Figure 2:
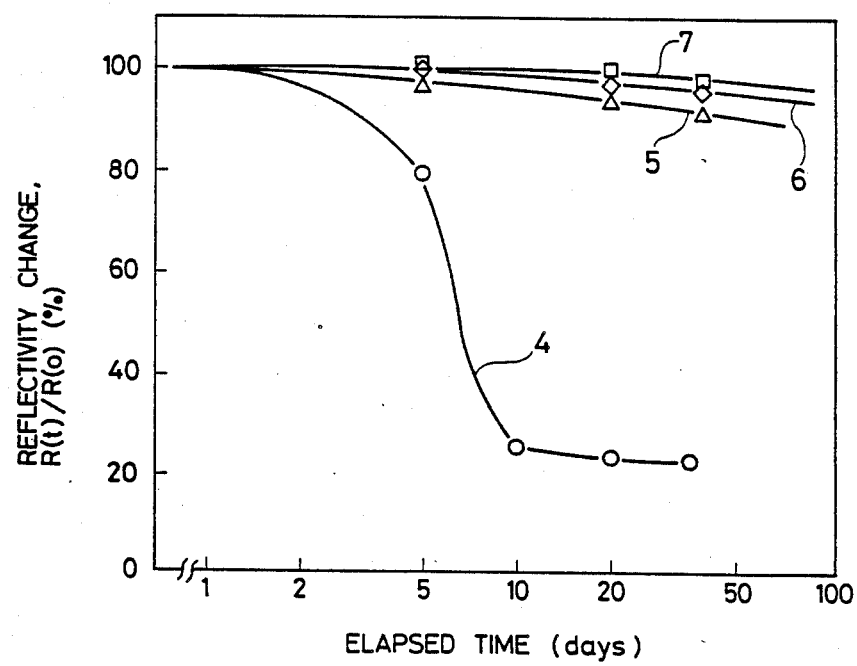
FIG. 2 is a graph showing the reflectivity changes with the lapse of time, of magneto-optical recording materials in another example of the present invention, in comparison with that of a prior-art material.

FIG. 2 illustrates the changes with the lapse of time, of the reflectivities of the surfaces of the films (the changes in the case where the films were aged under the conditions of a temperature of 60° C. and a humidity of 95%) by comparing the amorphous films of $Co_{69}Fe_8Tb_{23}$ (curve 5), $(Co_{0.95}Ru_{0.05})_{77}Tb_{23}$ (curve 6) and $(Co_{0.95}Ru_{0.05})_{75}Tb_{25}$ (curve 7) of the present invention with an amorphous film of $Fe_{75}Tb_{25}$ (curve 4) in a prior art. The reflectivity change is the ratio between the reflectivity R(t) after the aging and the reflectivity R(0) before the aging as indicated by percentage.

As seen from FIG. 2, when compared with the Fe-based alloy film in the prior art, the alloy film of the present invention is less in the reflectivity change with the lapse of time, in other words, it is much higher in the corrosion resistance.

EXAMPLE 3

In this example, Kerr rotation angles $\theta_k$ and crystallization temperatures $T_x$ were measured as to an amorphous film of $Fe_{72}Tb_{28}$ in a prior art and various amorphous films of magneto-optical recording materials according to the present invention. The measured results are listed in Table 1. The sample films used in this example were prepared by the magnetron sputtering method under the conditions of an argon atmosphere pressure of $5 \times 10^{-3}$ Torr and a power input of 1 kW, and all of them were 1000 Å thick. In addition, the wavelength of light used in the measurement of the Kerr rotation angle was 633 nm. It is understood from Table 1 that the amorphous film of the present invention has a greater Kerr rotation angle and a higher crystallization temperature as compared with the Fe-Tb amorphous film in the prior art.

length of light used for the measurement of the Kerr rotation angle was 633 nm as in Examples 1 and 3.

Each sample for measuring the reflectivity change was not provided with the $SiO_2$ protective film which was formed on the sample for measuring the Kerr rotation angle. The reflectivity change is the proportion (in %) of the reflectivity R(t) after the sample was let stand for 50 days under the conditions of a temperature of 60° C. and a humidity of 95%, to the reflectivity R(0) before it was let stand, and it is indicated by 100 R(t)/R(0). That is, the value of the reflectivity change is normalized by the value of the reflectivity at the time of the preparation of the film. The measurement of the reflectivity was performed from the amorphous film side by employing the light of the wavelength of 633 nm.

It is understood from Table 2 that the amorphous film of the composition in which part of Co is replaced with Fe is large in the value of the Kerr rotation angle $\theta_k$, and that the angle $\theta_k$ is enlarged by employing the two constituting elements such as Tb-Sm or Tb-Gd for the

TABLE 1

| No. | Alloy Composition | Kerr Rotation Angle, $\theta_k$(deg) | Crystallization Temp., Tx(°C.) |
|---|---|---|---|
| 1 | $Fe_{72}Tb_{28}$ | 0.25 | 370 |
| 2 | $(Co_{0.9}Fe_{0.1})_{77}Tb_{23}$ | 0.40 | 400 |
| 3 | $(Co_{0.96}Ge_{0.04})_{77}Tb_{23}$ | 0.34 | 405 |
| 4 | $(Co_{0.93}Ag_{0.07})_{75}Tb_{25}$ | 0.35 | 390 |
| 5 | $(Co_{0.93}Pt_{0.07})_{75}Tb_{25}$ | 0.35 | 390 |
| 6 | $(Co_{0.93}Fe_{0.07})_{75}Gd_{25}$ | 0.38 | 407 |
| 7 | $(Co_{0.93}Fe_{0.07})_{75}Dy_{25}$ | 0.35 | 385 |
| 8 | $(Co_{0.91}Fe_{0.09})_{77}Ho_{23}$ | 0.35 | 390 |
| 9 | $(Co_{0.84}Fe_{0.1}Al_{0.06})_{77}Tb_{23}$ | 0.39 | 380 |
| 10 | $(Co_{0.84}Fe_{0.1}Nb_{0.06})_{77}Tb_{23}$ | 0.38 | 410 |
| 11 | $(Co_{0.84}Fe_{0.1}Pt_{0.06})_{77}Tb_{23}$ | 0.38 | 390 |
| 12 | $(Tb_{0.5}Gd_{0.5})_{24}(Co_{0.92}Fe_{0.08})_{76}$ | 0.42 | 405 |
| 13 | $Tb_{25}(Co_{0.91}Fe_{0.07}Ge_{0.02})_{75}$ | 0.41 | 410 |
| 14 | $Tb_{23}(Co_{0.84}Fe_{0.10}Cu_{0.06})_{77}$ | 0.37 | 380 |
| 15 | $(Tb_{0.78}Sm_{0.22})_{23}(Co_{0.96}Pt_{0.04})_{77}$ | 0.38 | 390 |
| 16 | $(Tb_{0.6}Dy_{0.4})_{25}(Co_{0.93}Fe_{0.07})_{75}$ | 0.38 | 400 |

EXAMPLE 4

In this example, Kerr rotation angles $\theta_k$ and reflectivity changes after samples were let stand for 50 days were measured as to an amorphous film of $Fe_{75}Tb_{25}$ in a prior art and various amorphous films of magneto-optical recording materials according to the present invention. The measured results are listed in Table 2. The amorphous films were prepared by the same method as in Example 3, and all of them were 1000 Å thick.

rare-earth elements (R in the composition formula mentioned before), unlike the single element Tb. Moreover, Sm and Dy are effective to enhance the recording sensitivity.

As apparent from Table 2, the $Fe_{75}Tb_{25}$ amorphous film in the prior art exhibits a great reflectivity change and is therefore inferior in the corrosion resistance. In general, Fe-based amorphous alloy films other than this $Fe_{75}Tb_{25}$ film mentioned here are also inferior in the corrosion resistance. In contrast, the alloy films of the

TABLE 2

| No. | Alloy Composition | Kerr Rotation Angle, $\theta_k$(deg) | Reflectivity Change (%) |
|---|---|---|---|
| 21 | $Fe_{75}Tb_{25}$ | 0.22 | 20 |
| 22 | $(Co_{0.9}Fe_{0.1})_{77}Tb_{23}$ | 0.37 | 90 |
| 23 | $(Co_{0.8}Fe_{0.2})_{77}(Tb_{0.8}Sm_{0.2})_{23}$ | 0.38 | 80 |
| 24 | $(Co_{0.8}Fe_{0.2})_{75}(Tb_{0.5}Gd_{0.5})_{25}$ | 0.42 | 85 |
| 25 | $(Co_{0.9}Fe_{0.1})_{77}(Tb_{0.9}Dy_{0.1})_{23}$ | 0.35 | 88 |
| 26 | $(Co_{0.95}Pt_{0.05})_{77}Tb_{23}$ | 0.35 | 92 |
| 27 | $(Co_{0.95}Pt_{0.05})_{80}(Tb_{0.9}Sm_{0.1})_{20}$ | 0.36 | 90 |
| 28 | $(Co_{0.95}Pt_{0.05})_{80}(Tb_{0.5}Gd_{0.5})_{20}$ | 0.40 | 80 |
| 29 | $(Co_{0.95}Pt_{0.05})_{80}(Tb_{0.9}Dy_{0.1})_{20}$ | 0.33 | 83 |
| 30 | $(Co_{0.84}Fe_{0.10}Al_{0.06})_{77}Tb_{23}$ | 0.39 | 95 |
| 31 | $(Co_{0.84}Fe_{0.10}Nb_{0.06})_{77}Tb_{23}$ | 0.38 | 93 |
| 32 | $(Co_{0.84}Fe_{0.10}Ni_{0.06})_{77}Tb_{23}$ | 0.36 | 92 |

Regarding each sample for measuring the Kerr rotation angle, after the amorphous film was prepared, an $SiO_2$ protective film was formed thereon to a thickness of about 500 Å by evaporation in order to prevent the oxidation of the surface thereof. The Kerr rotation angle was measured through the substrate. The wavemagneto-optical recording materials according to the present invention are favorable in the corrosion resistance. In the alloy films of the present invention, Co in the transition metals accounts for at least 50%, which plays an important role for the improvement in the corrosion resistance. Further, by adding Pt, Al, Nb, Ni or the like, the corrosion resistance can be still bettered without degrading the Kerr rotation angle.

EXAMPLE 5

On a disc-shaped glass substrate having diameter of 5 inches, an $SiO_2$ film (about 500 Å thick), a $(Co_{0.9}Fe_{0.1})_{75}Tb_{25}$ amorphous film (1000 Å thick) and an $SiO_2$ film (about 700 Å thick) were deposited in this order by the magnetron sputtering method, thereby to prepare a magneto-optical recording medium. The read output-to-noise ratio C/N of this recording medium was measured under the conditions of a measurement frequency of 1 MHz and a band width of $\Delta f = 30$ kHz. Then C/N = 58 dB for a bit length of 1.3 μm, which is a high read output suited for practical use, was obtained.

As apparent from the above description, the Co-based perpendicularly-magnetized amorphous film of the present invention has been found an excellent magneto-optical recording material which is superior in the thermal stability, the corrosion resistance etc. and which can afford a greater read output-to-noise ratio (C/N).

What is claimed is:

1. A magneto-optical recording medium comprising a magneto-optical recording material disposed on a substrate as a thin film, said magneto-optical recording material having a composition indicated by $(Co_{1-a}M_a)_{100-y}R_y$ where M denotes a Fe and at least one element selected from the group consisting of Ni, Ag, and B; R denotes a single element selected from the group consisting of Tb, Gd, Dy and Ho; the value "a" satisfies $0 < a \leq 0.5$, while the value of "y" satisfies $14 \leq y \leq 36$ in terms of atomic percent; said magneto-optical recording material being amorphous and being capable of magneto-optically recording based upon magnetic compensation temperature.

2. A magneto-optical recording medium according to claim 1, wherein M denotes Fe and Ag.

3. A magneto-optical recording medium according to claim 1, wherein R denotes Tb.

4. A magneto-optical recording medium according to claim 3, wherein M denotes Fe and at least one element selected from the group consisting of Ni and B.

5. A magneto-optical recording medium according to claim 4, wherein M denotes Fe and Ni.

6. A magneto-optical recording medium according to claim 4, wherein M denotes Fe and B.

7. A magneto-optical recording medium according to claim 1, wherein said thin film is a perpendicularly magnetized thin film.

8. A magneto-optical recording medium according to claim 1, wherein the value of "y" satisfies $22 \leq y \leq 29$.

9. A magneto-optical recording medium according to claim 1, wherein the value "a" satisfies $0 < a \leq 0.1$.

10. A magneto-optical recording medium according to claim 1, wherein said thin film has a thickness of from 200 to 1,500 Å.

11. A magneto-optical recording medium comprising a magneto-optical recording material disposed on a substrate as a thin film, said magneto-optical recording material having a composition indicated by $(Co_{1-a}M_a)_{100-y}R_y$ where M denotes at least one element selected from the group consisting of Ni, Ag and B; R denotes a single element selected from the group consisting of Tb, Gd, Dy and Ho; the value "a" satisfies $0 \leq a \leq 0.5$, while the value of "y" satisfies $14 \leq y \leq 36$ in terms of atomic percent; said magneto-optical recording material being amorphous and being capable of magneto-optically recording based upon magnetic compensation temperature.

12. A magneto-optical recording medium according to claim 11, wherein M denotes Ag.

13. A magneto-optical recording medium according to claim 11, wherein said thin film is a perpendicularly magnetized thin film.

14. A magneto-optical recording medium according to claim 11, wherein the value of "y" satisfies $22 \leq y \leq 29$.

15. A magneto-optical recording medium according to claim 11, wherein the value "a" satisfies $0 < a \leq 0.1$.

16. A magneto-optical recording medium according to claim 11, wherein said thin film has a thickness of from 200 to 1,500 Å.

17. A magneto-optical recording medium according to claim 11, wherein R denotes Tb.

18. A magneto-optical recording medium according to claim 17, wherein M denotes at least one element selected from the group consisting of Ni and B.

19. A magneto-optical recording medium according to claim 18, wherein M denotes Ni.

20. A magneto-optical recording medium according to claim 18, wherein M denotes B.

* * * * *